US006434616B2

United States Patent
Urano et al.

(10) Patent No.: US 6,434,616 B2
(45) Date of Patent: Aug. 13, 2002

(54) METHOD FOR MONITORING ABNORMAL BEHAVIOR IN A COMPUTER SYSTEM

(75) Inventors: Akihiro Urano, Fujisawa; Toshiaki Hirata, Kashiwa; Shuji Fujino, Ebina; Toshio Sato, Fujisawa, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/911,386

(22) Filed: Jul. 25, 2001

Related U.S. Application Data

(63) Continuation of application No. 09/186,076, filed on Nov. 5, 1998.

(30) Foreign Application Priority Data

Nov. 7, 1997 (JP) .............................................. 9-306068

(51) Int. Cl.⁷ .............................................. G06F 13/00
(52) U.S. Cl. ...................................................... 709/224
(58) Field of Search ................................ 709/224, 223, 709/225, 226

(56) References Cited

U.S. PATENT DOCUMENTS

| 5,655,081 A | 8/1997 | Bonnell et al. |
| 5,768,552 A | 6/1998 | Jacoby |
| 5,819,094 A | 10/1998 | Sato et al. |
| 6,044,476 A | 3/2000 | Ote et al. |
| 6,049,827 A | 4/2000 | Sugauchi et al. |
| 6,085,244 A | 7/2000 | Wookey |
| 6,119,159 A | 9/2000 | Tseng et al. |
| 6,138,249 A | 10/2000 | Nolet |
| 6,138,250 A | 10/2000 | Nouri et al. |

FOREIGN PATENT DOCUMENTS

EP 503784 9/1992

*Primary Examiner*—David Wiley
(74) *Attorney, Agent, or Firm*—Antonelli, Terry, Stout & Kraus, LLP

(57) ABSTRACT

The present invention relates to a method for monitoring a computer system in which one manager computer is connected to a plurality of agent computers over a network. The manager computer sends information on the types of log to be collected to the plurality of agent computers. In response, the plurality of agent computers collect the specified types of log. Then, the plurality of agent computers send the collected logs to the manager computer. Thus, the plurality of agent computers are able to collect the types of log specified by the manager computer.

4 Claims, 9 Drawing Sheets

FIG.4

| OBTAINED INFORMATION | PROBABLE CAUSE (SUPPOSED CAUSE) | INVESTIGATION METHOD | ACTION |
|---|---|---|---|
| PROCESSING RESULT ERROR | INCORRECT COMMUNICATION CONDITION | CHECK COMMUNICATION LOG | |
| COMMUNICATION ERROR | DISK OVERFOLW | CHECK AMOUNT OF FREE DISK SPACE | |
| AMOUNT OF FILE TRANSFER DATA ON NETWORK IS TOO LARGE | AUTOMATIC BACKUP OPERATION | INVESTIGATE BACKUP PLAN OR STATUS OF COMPUTER WITH BACKUP UNIT | NO PROBLEM IF BACKUP IS IN PROGRESS |
| AMOUNT OF FILE TRANSFER DATA ON NETWORK IS TOO LARGE | MANUAL BACKUP BY OPERATOR | INVESTIGATE WHETHER USER TRANSFERRING FILES HAS A BACKUP AUTHORITY OR IF USER HAS ISSUED A BACKUP INSTRUCTION | NO PROBLEM IF BACKUP IS IN PROGRESS |
| AMOUNT OF FILE TRANSFER DATA ON NETWORK IS TOO LARGE | AN ATTACKER IS STEALING DATA | CHECK USER TRANSRERRING DATA | REPORT TO OPERATOR |

METHOD FOR MONITORING ABNORMAL BEHAVIOR IN A COMPUTER SYSTEM

This is a continuation of parent application Ser. No. 09/186,076, filed Nov. 5, 1998, allowed.

The present application is related to U.S. application Ser. No. 09/058,177, filed Apr. 10, 1998 and U.S. application Ser. No. 09/063,445, filed Apr. 21, 1998.

BACKGROUND OF THE INVENTION

The present invention relates to a method for monitoring a computer system, and more particularly to a technology for handling a computer log.

Conventionally, methods for transferring various types of computer logs over a network for monitoring on another computer have been widely used. However, most of those methods transfer all logs, increasing the network load and sometimes developing a problem especially when the amount of log data produced by the sending computers exceeds the network transfer capacity. The processing load of the receiving computer also increases because it must analyze a large amount of log information. To solve this problem, some operating systems add a priority to each log message. This added information specifies whether to discard messages, whether to record messages in log files, or whether to transfer messages to another computer.

As described above, the conventional methods extract and transfer logs which are assumed to be important based on the criteria determined only by the log outputting computers. Thus, the load on the network or on the log receiving computer is not always reduced because whether or not logs are important are determined based on the criteria of the log outputting computers. In addition, a log message, once considered not very important by log outputting computers, is not sent to the monitoring computer which might consider the log message very important.

Furthermore, administrators must associate log messages sent from one computer with those sent from another computer or obtain more detailed information on the logs depending upon the output log.

Some conventional methods also indicate the importance of output information by color change although the color changes based only on the importance determined by the corresponding host.

Conventionally, log information has been written directly to non-volatile storage. Log information is also written via a network to non-volatile which is usually remote non-volatile storage.

However, generated operation history data may change or may be altered while it is sent to non-volatile storage, while it is processed in the computer, or while it is stored in main storage or non-volatile storage. In conventional methods, these changes and alterations cannot be detected. Therefore, the validity of log information, when read from non-volatile storage where it has been saved, can be guaranteed, nor the changed or altered log information can be restored to the original log information even if the change or alteration is detected.

SUMMARY OF THE INVENTION

It is an object of the present invention to provide a method of collecting an amount of log information enough to keep track of the status of agents without a heavy processing load on both the network and the manager computer.

It is another object of the present invention to provide a method of detecting an event which could not be identified by monitoring the status of only one computer.

It is still another object of the present invention to provide a method of representing the location of an error within the computer and the severity level of the error so that an operator can understand them easily the moment the operator views the monitoring screen.

It is still another object of the present invention to provide a method of automating the association of log information output by a plurality of computers and, depending upon the output information, the collection of more detailed information in order to reduce the load on an administrator.

It is still another object of the present invention to provide a method of preventing log information from being altered or wire-tapped or preventing false log information from being included and, even if log information is partially altered, a method of restoring the partially-altered information to the original information.

To achieve the above objects, the method according to the present invention concurrently monitors log information collected from a plurality of computers and integrally checks the validity and consistency of the log information to find an invalid action.

The method according to the present invention allows an alarm or log monitoring computer to assign a surveillance level to the computers which are monitored.

The method according to the present invention supposes the cause of an event from the contents output to a log, collects more detailed log information to prove the supposition, and determine the cause of the event.

The method according to the present invention informs an operator of a computer performing invalid behavior by changing colors on the monitor screen or by changing an alarm sound.

The computer monitoring method according to the present invention adds a digital signature before saving or transferring a log.

The computer monitoring method according to the present invention adds redundant information to a log to allow the original log data to be restored even when part of the log is lost or altered.

The computer monitoring method according to the present invention also divides a log and saves it on a plurality of computers to allow part of divided log data to be restored even if it is lost or altered.

BRIEF DESCRIPTION OF THE DRAWINGS

FIG. 4 is a diagram showing an example of the contents of an analysis rule case DB.

DESCRIPTION OF THE PREFERRED EMBODIMENTS

In the following description, a computer which outputs a log and is monitored by some other computer is called an agent, while a computer which analyzes the log to monitor the agent is called a manager. A data base is abbreviated to DB.

Figure 1:
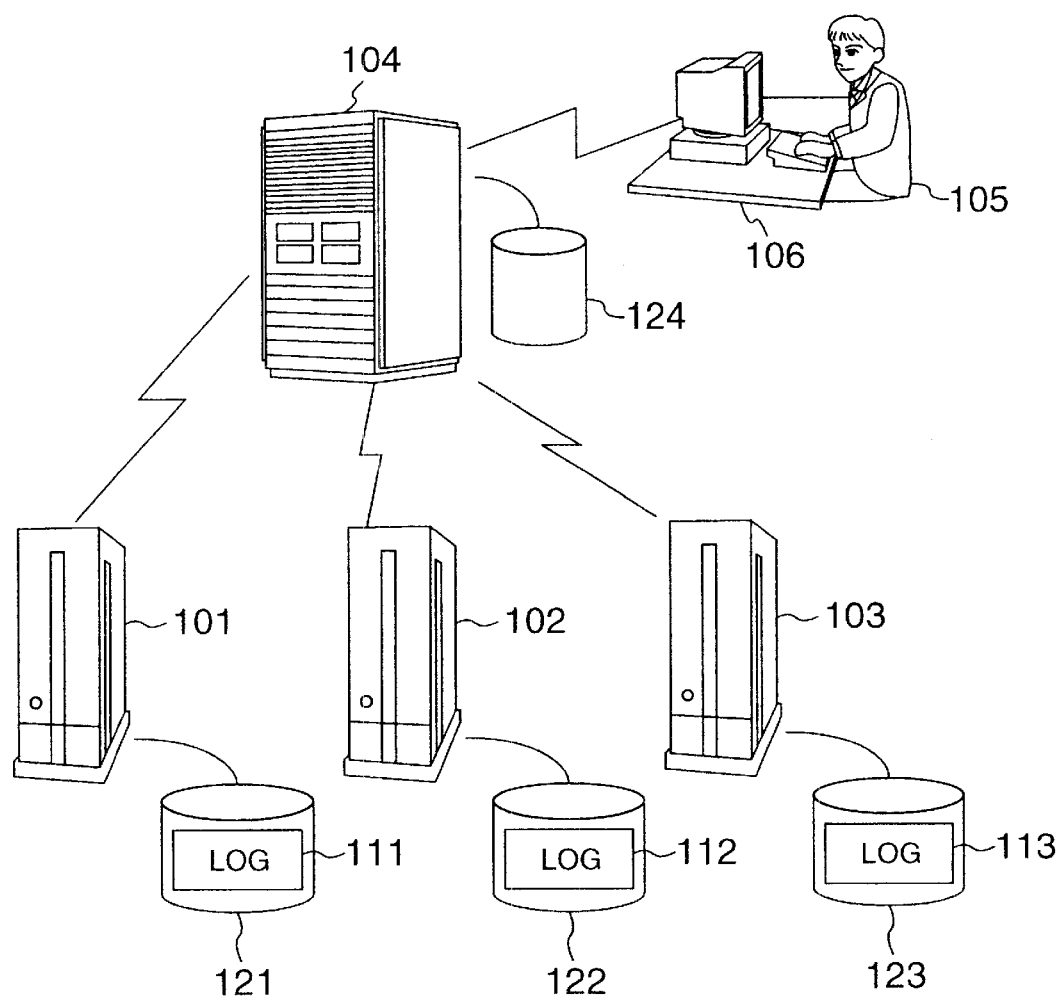
FIG. 1 is a diagram showing the overall configuration of a computer system used in an embodiment.

In FIG. 1, computers 101, 102, and 103 are computers which are monitored, while a computer 104 is a computer which performs monitoring. The computers 101, 102, and 103 output logs 111, 112, and 113 which are stored in non-volatile storage 121, 122, and 123, respectively. Information on which log to collect, which is stored in non-volatile storage 124 of the manager computer 104, is sent to the computers 101, 102, and 103 as necessary and is stored in the non-volatile storage 121, 122, and 123. Although only three agent computers 101, 102, and 103 are shown in this figure, any number of agent computers may be used connected to the manager computer 104. Furthermore, the manager computer 104 may also be an agent.

Figure 2:
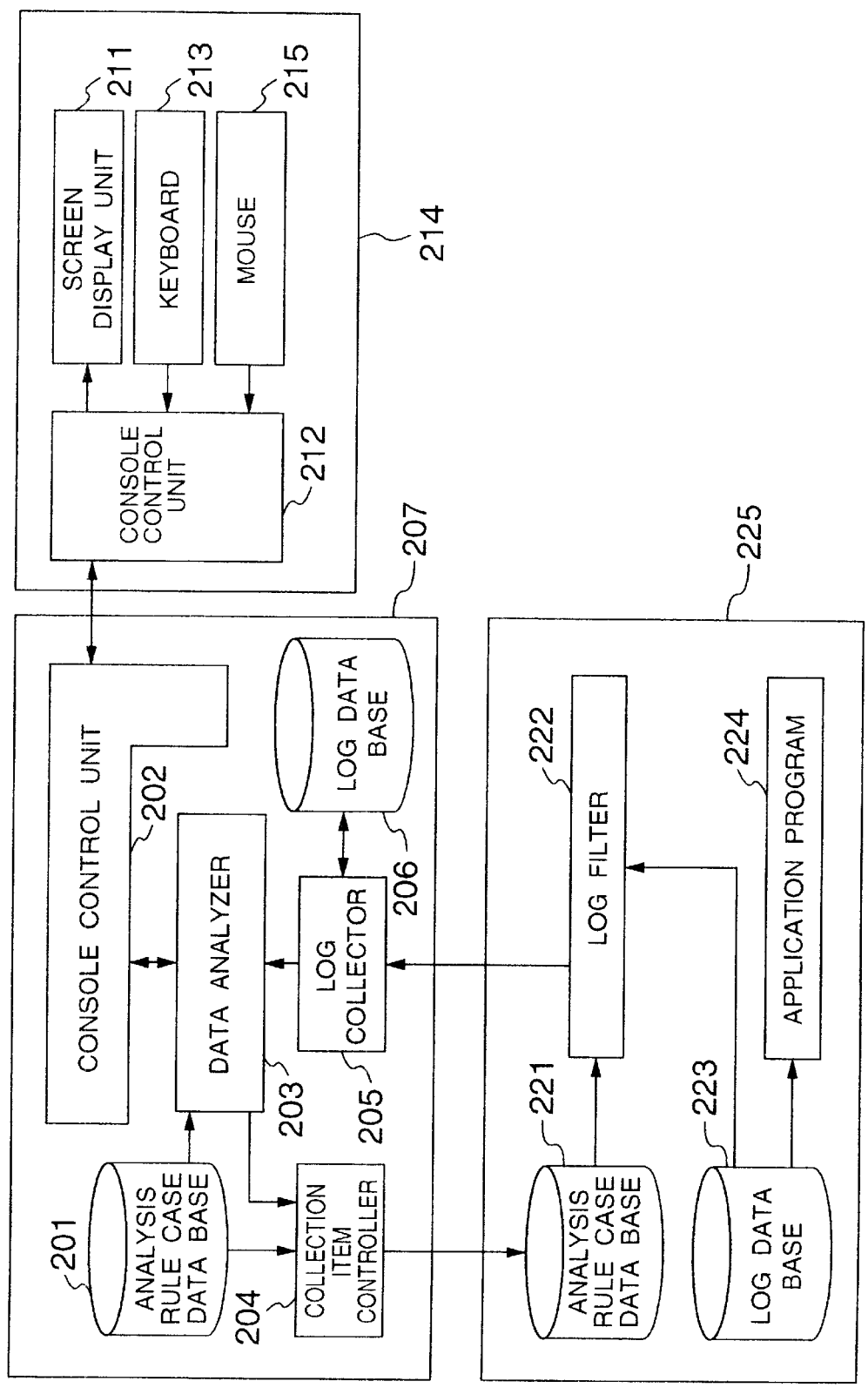
FIG. 2 is a diagram showing the system configuration of a manager and an agent.

FIG. 2 shows the details of an agent and the manager shown in FIG. 1. An analysis rule case data base 201, which is stored in the non-volatile storage, contains information shown in FIG. 4; that is, information on the probable cause of an event recorded in a log, the investigation method of the probable cause of the event, and the action to be taken when the cause is determined. A data analyzer 203 transfers some analysis rule cases to the agent via a collection item controller 204. The transferred analysis rules are stored, in advance, in an analysis rule case data base 221 allocated in non-volatile storage.

A log output by an application program 224 is stored in a log data base 223 which is allocated on non-volatile storage.

Figure 3:
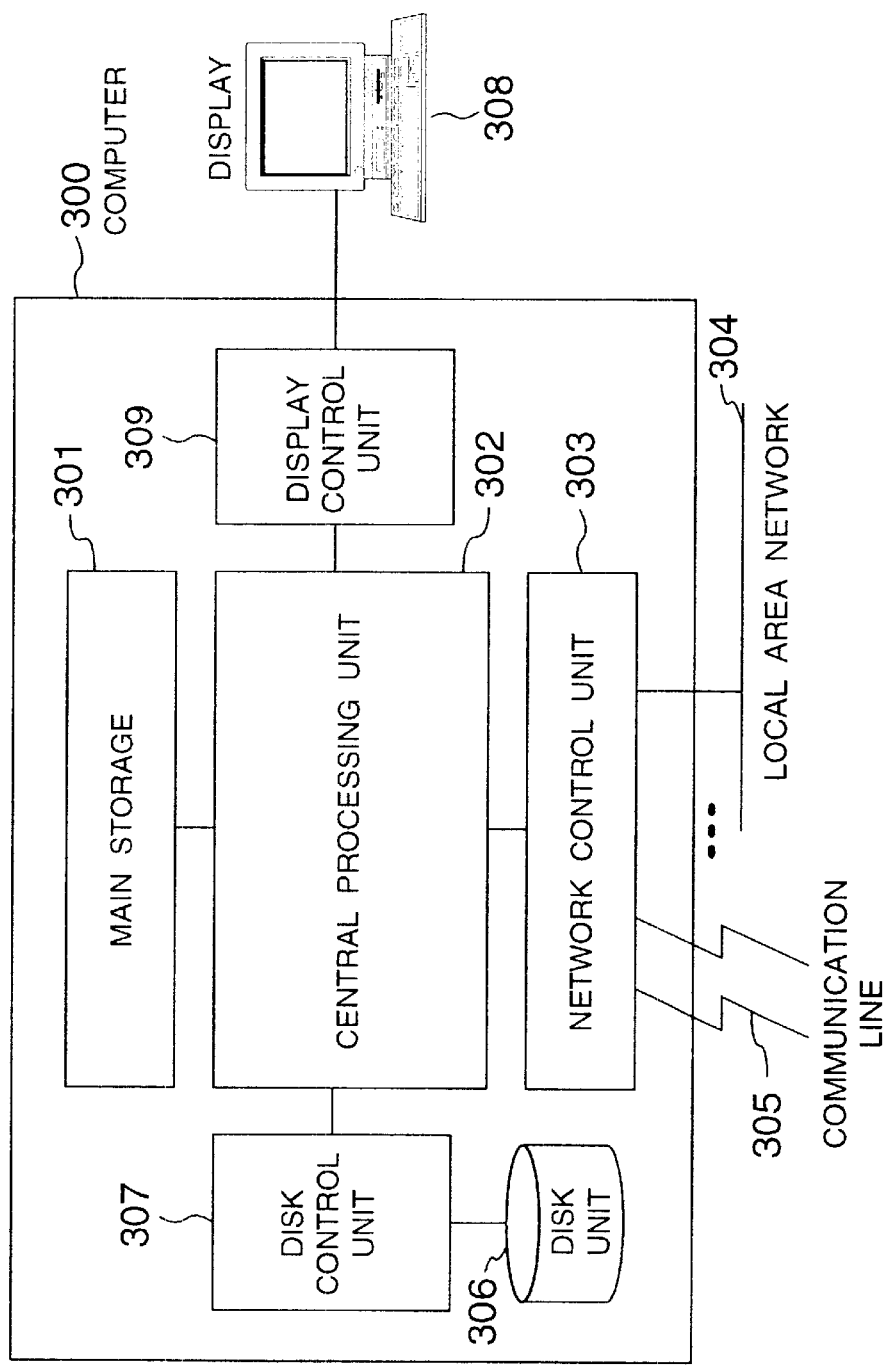
FIG. 3 is a diagram showing the hardware configuration of each computer of the manager and agents.

FIG. 3 shows the hardware configuration of each of the computers 101, 102, 103, 104, and 106.

As shown in FIG. 3, each computer 300 comprises a central processing unit 302, main storage 301, a network control unit 303 which controls the transfer of data to or from a communication line 305 or a local area network 304, a disk control unit 307 which controls a disk unit 306, and a display controller 309 which controls a display 308.

FIG. 4 shows an example of the analysis rule case data base 201. The data base, containing data in the tabular form, stores various types of information such as information obtained from a log, the probable cause implied by the information, the investigation method of proving that the probable cause is true, and the action to be taken when the cause is determined.

Figure 5:
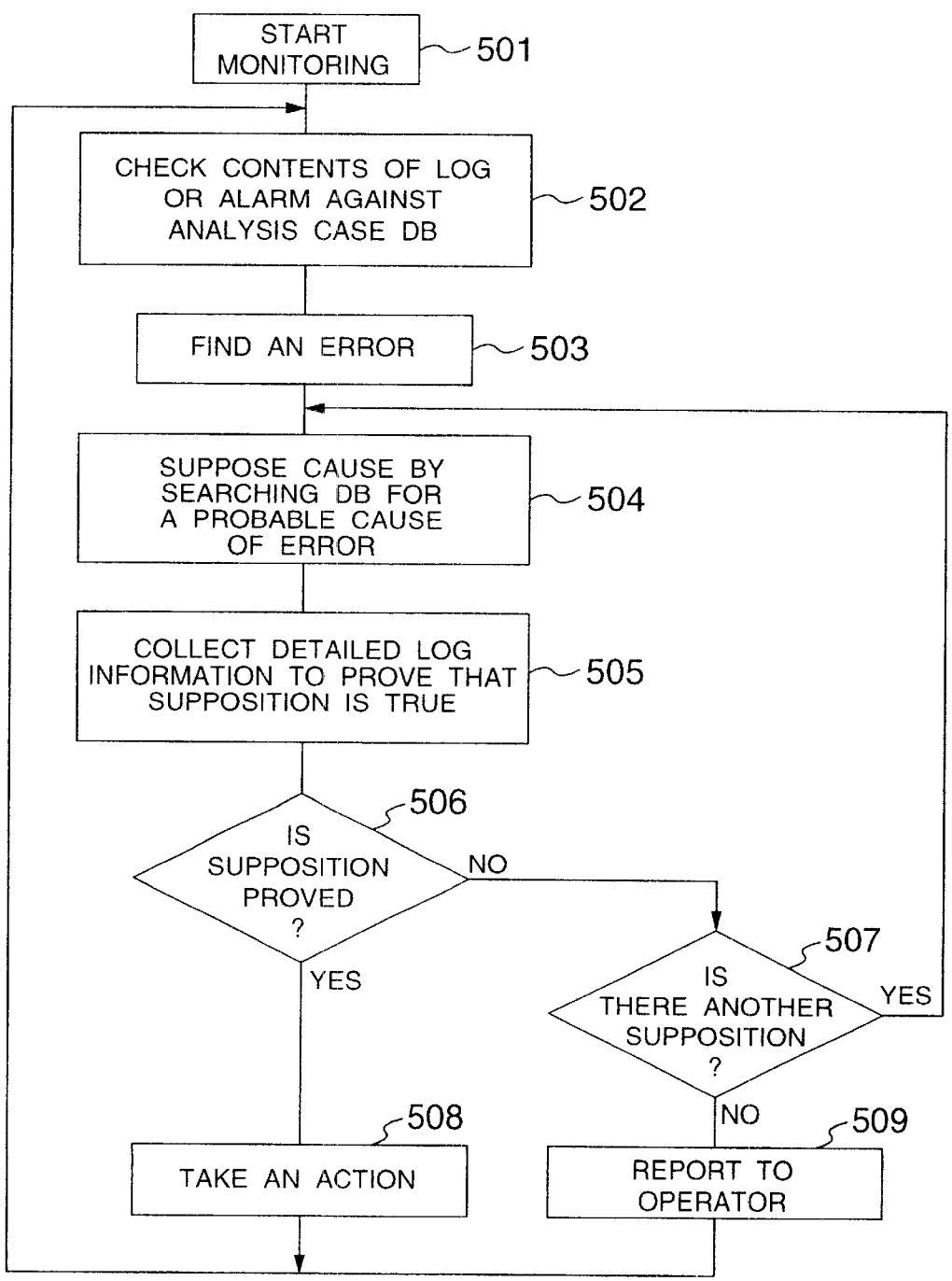
FIG. 5 is a diagram showing a basic procedure for supposing the cause of an event from the contents output to a log, collecting detailed log information to prove the supposition, and determining the cause of the event.

FIG. 5 is a flowchart showing how the data analyzer 203 analyzes log data. First, the data analyzer starts monitoring (step 501) and checks the contents of the log or alarm against the analysis case DB (step 502). As a result, the data analyzer finds an error (step 503), supposes the cause by searching the DB for a probable cause of the error (step 504), and collects detailed log information to prove that the supposition is true (step 505). Then, the data analyzer checks if the supposition is proved (step 506) and, if it is, takes the action (step 508). If the supposition is not proved, the data analyzer checks if there is another supposition (step 507). If there is not another supposition, the data analyzer sends a message to the operator (step 509); if there is, control is passed back to step 504.

The following describes the operation described above by referring to FIG. 2:

A log filter 222 of an agent computer 225 gets data from the log data base 223 according to the rule cases stored in the non-volatile storage and transfers the data to a log collector 205 of a manager computer 207. The transferred data is saved in a log data base 206. The data analyzer 203 gets log data from the log collector 205 according to the rule cases stored in the analysis rule case data base 201 and analyzes the data. At this time, the data analyzer 203 tells the collection item controller 204 to collect a more detailed log as necessary. The collection item controller 204 checks the load on the machine and the network and on the amount of collected log against the analysis rule case data base 201 to control the log items to be collected.

The data analyzer 203 sends the analysis result to a console control unit 202 and then to a console control unit 212 in a console computer for display on a screen display unit 211.

An instruction, entered by the operator via a keyboard 213 and a mouse 215, is sent to the data analyzer 203 via the console control unit 212 and the console control unit 202.

The following describes the operation by referring to FIG. 1. The summary of the logs stored in the non-volatile storage 121, 122, and 123 and the logs considered important are sent to the manager computer 104 over the network.

An instruction concerning the rules governing which log is important and which log should be sent to the manager computer 104 are sent, in advance, from the manager computer 104 to the agent computers 101, 102, and 103. This instruction is sent when the system is built and each time the manager computer 104 requests that the instruction be sent. For example, when the load on the network or the manager computer 104 is high, the manager computer 104 sends an instruction requesting to send only the important logs to reduce the amount of logs that are sent; when careful monitoring is required, the manager computer 104 sends an instruction requesting to send more logs including those that are considered not very important.

The manager computer 104 analyzes and monitors the logs 111, 112, and 113 not only individually but also all at a time to check an event that is found by comparing them with each other.

An operator 105 operates a console computer 106. The console computer 106 requests the manager computer 104 to send necessary information. In response, the manager computer 104 sends back requested information if it is recorded on non-volatile storage 124. If the manager computer 104 must send an inquiry to remote agent computers 101, 102, and 103 to respond to the requested information, the manager computer 104 tells the console computer 106 that there is a need to send the inquiry and waits for the operator to respond. Upon receiving from the operator an instruction to make the inquiry, the manager computer 104 communicates with agent computers 101, 102, and 103, gets logs, and then sends the result back to the console computer 106.

In the above example, if the manager computer 104 cannot respond to the request immediately, it must wait for the operator 105 to send an instruction as described above. It is also possible for the manager computer 104 to communicate with the agent computers 101, 02, and 103 while it is waiting for the operator 105 to send the instruction. This reduces the time between the time the manager computer 104 receives the instruction from the operator 105 and the time manager computer 104 sends the requested information back to the operator 105.

In the above example, if the manager computer 104 cannot respond to the request immediately, the operator 105 decides whether to make an inquiry to the remote computers. This decision may also be made by the manager computer 104 or the console computer 106.

In the above example, the operator 105 decides to collect more detailed information. This decision may also be made automatically by the console computer 106 or the manager computer 104 checking the logs collected so far. Or, one of the agent computers 101, 102, and 103 may find a need to collect more detailed information and sends to the manager computer 104 an alarm indicating the need to do so.

In addition, when the manager computer 104 finds that the amount of information it has is too small to respond to the request from the operator 105, the manager computer 104 may suppose what is happening in agent computers 101, 102, and 103, instead of requesting them to send information, and may send an inquiry to the agent computers 101, 102, and 103 to prove that supposition. For example, assume that the agent computer 101 and the agent computer 102 are communicating with each other to perform calculation. Also assume that the agent computer 101 and the agent computer 102 cannot communicate correctly with each other because of a non-volatile storage overflow or a hardware error in the agent computer 101. In this case, if the computer 102 does not detect the condition, the computer 102 keeps on generating incorrect answers.

When one of the manager computer 104, console computer 106, and operator 105 detects an abnormal condition, the manager computer 104 collects more detailed information. At this time, the manager computer 104 supposes that "the computer 102 outputs an incorrect answer because it cannot communicate with the agent computer 101" and requests the agent computer 101 and/or the computer 102 to send the communication records. If the records indicate that the communication was incorrect, the supposition is proved to be true. In addition, the manager computer 104 supposes that the communication error was caused by an overflow in the non-volatile storage of the agent computer 101 and requests the agent computer 101 to report the status of the non-volatile storage. If the agent computer 101 reports that there was an overflow in the non-volatile storage, the supposition made by the manager computer 104 is proved to be true.

Figure 6:
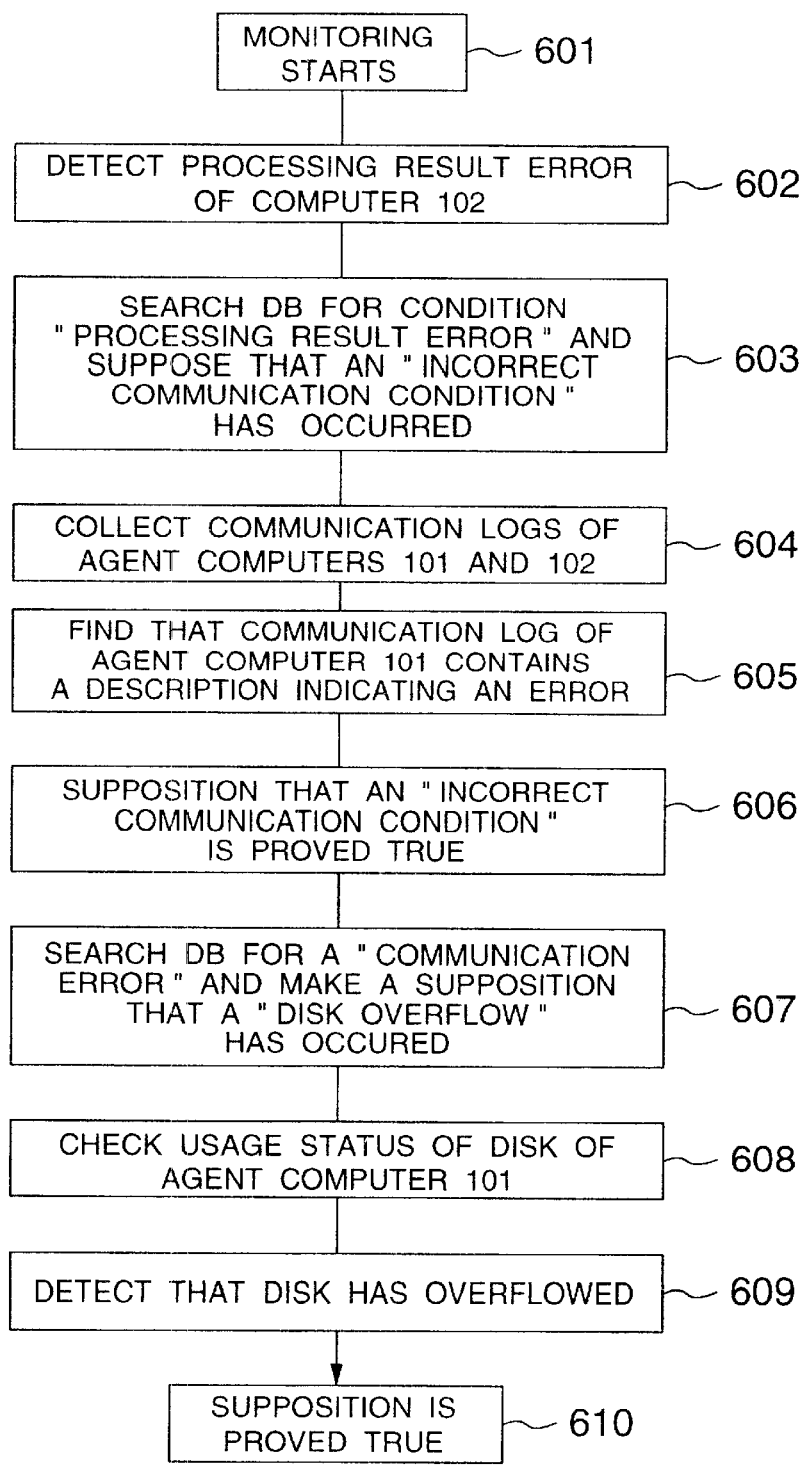
FIG. 6 is a flowchart showing a first procedure for supposing the cause of an event from the contents output to a log, collecting detailed log information to prove the supposition, and determining the cause of the event.

FIG. 6 is a flowchart showing the supposition. Monitoring starts (step 601), and the processing result error of the computer 102 is detected (step 602). As a result, the manager computer 104 searches the DB for the condition "processing result error" and supposes that an "incorrect communication condition" has occurred (step 603). Next, the manager computer 104 collects the communication logs of the agent computers 101 and 102 (step 604), and finds that the communication log of the agent computer 101 contains a description indicating an error (step 605). The manager computer 104 thus proves that an "incorrect communication condition" has occurred (step 606), searches the DB for a "communication error", and makes a supposition that a "disk overflow" has occurred (step 607). Then, the manager computer 104 checks the usage status of the disk of the agent computer 101 (step 608), detects that the disk has overflowed (step 609), and proves that the supposition is true (step 610).

In this example, the manager computer 104 supposes that an event has occurred and collects the logs to verify it. At first, the manager computer 104 transfers only part of the logs of the agent computers 101 and 102 and then, in order to collect more detailed longs to verify the supposition, collects only the logs necessary to verify the supposition. This method reduces the amount of logs to be collected, reduces the load on the manager computer 104 necessary to make an analysis, and minimizes the network traffic.

In the above examples, only real-time processing is described. The manager computer 104 may also collect logs at a regular interval to perform the same processing in the batch mode.

Figure 9:
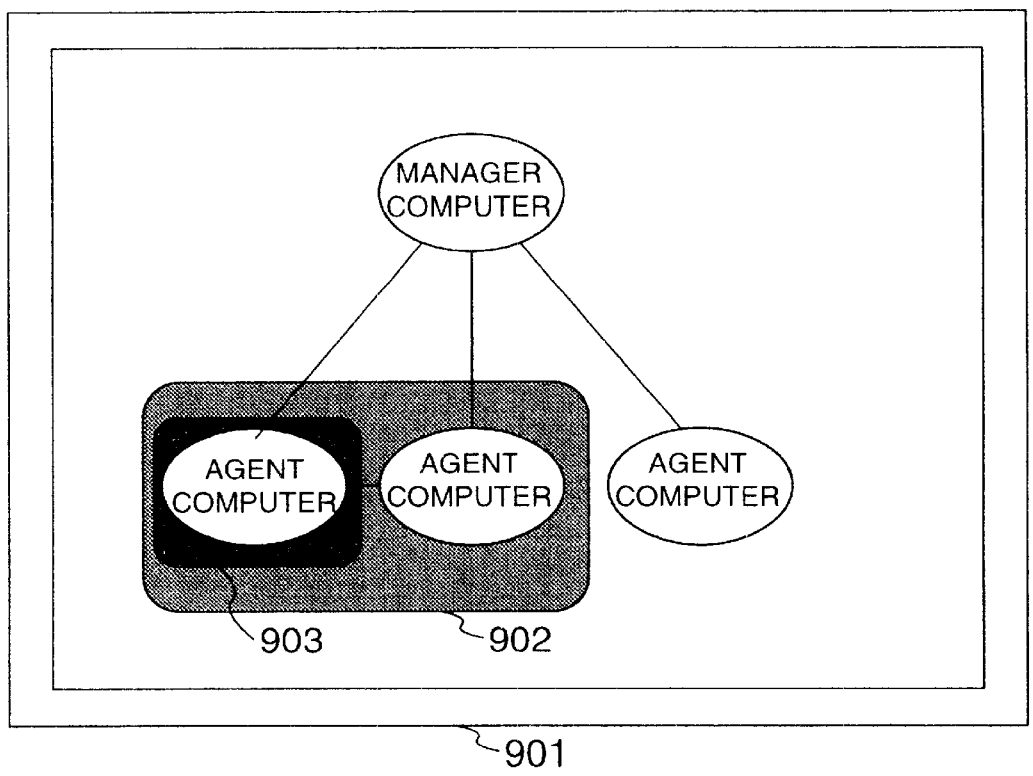
FIG. 9 is a diagram showing the configuration of an example of the operator monitor screen.

FIG. 9 shows a screen 901 provided on the console computer 106. On this screen, the color of information provided to the operator 105 changes according to the severity, or the range, of an error. For example, when an error from the computer 102 is detected as in the above example, a yellow warning display 902 appears around the screen portion corresponding to the agent computers 101 and 102 when a supposition is made that the communication between the agent computer 101 and the computer 102 is incorrect. In addition, when a supposition is made that the agent computer 101 is the cause of the error, a red warning display 903, rather than the yellow warning display 902, appears around the screen portion corresponding to the agent computer 101. In this example, the color is changed when the supposition is made; instead, the color may be changed when the supposition is proved.

Figure 8:
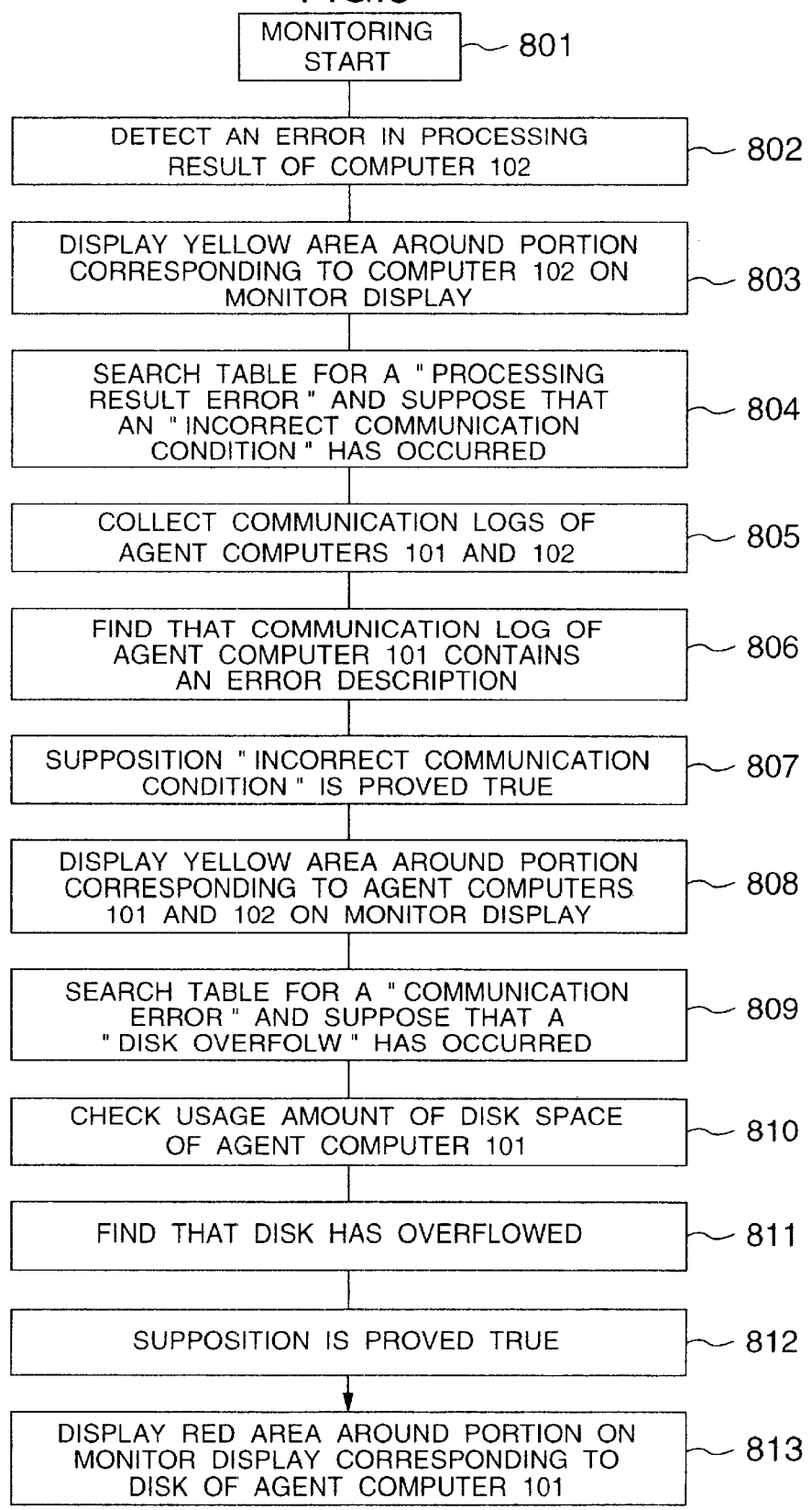
FIG. 8 is a flowchart showing a procedure for displaying colors on the console screen when supposing the cause of an event from the contents output to a log, collecting detailed log information to prove the supposition, and determining the cause of the event.

FIG. 8 is a flowchart showing the processing described above. Monitoring starts (step 801) and, when the manager computer 104 detects an error in the processing result of the computer 102 (step 802), it displays the yellow area around the portion corresponding to the computer 102 on the monitor display (step 803). The manager computer 104 searches the table for a "processing result error" and supposes that an "incorrect communication condition" has occurred (step 804). Next, the manager computer 104 collects the communication logs of the agent computers 101 and 102 (step 805) and finds that the communication log of the agent computer 101 contains an error description (step 806). This proves that the supposition "incorrect communication condition" is true. Then, the manager computer 104 displays the yellow area around the portion corresponding to the agent computers 101 and 102 on the monitor display (step 808). Then, the manager computer 104 searches the table for a "communication error" and supposes that a "disk overflow" has occurred (step 809). The manager computer 104 checks the usage amount of disk space of the agent computer 101 (step 810) and finds that the disk has overflowed (step 811). As a result, the manager computer 104 proves that the supposition is true (step 812) and displays the red area around the portion on the monitor display corresponding to the disk of the agent computer 101 (step 813).

In the above description, the manager computer 104 monitors the overall conditions of the agent computers 101, 102, and 103. The manager computer 104 may also act as a system specifically intended for computer security.

Figure 7:
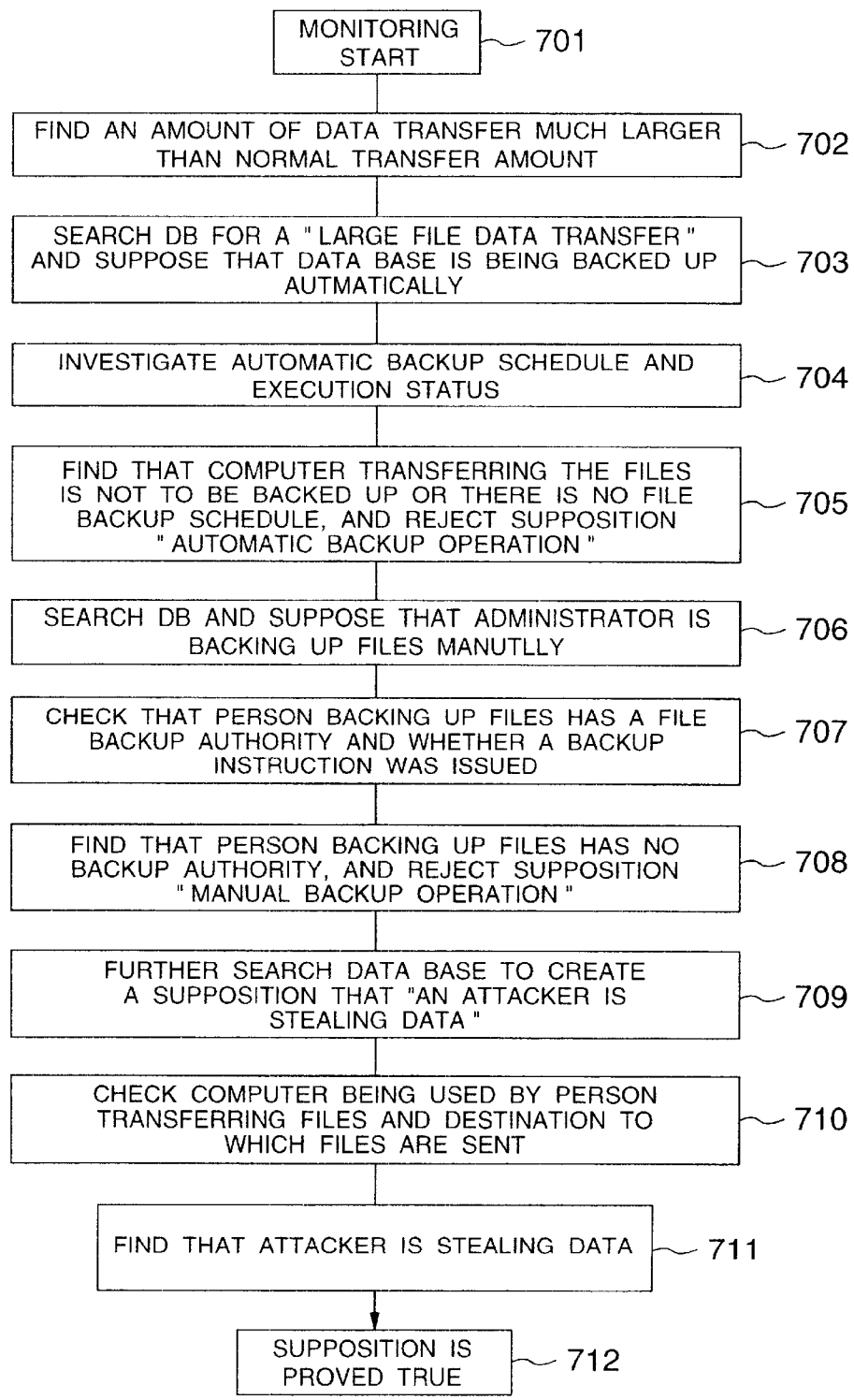
FIG. 7 is a flowchart showing a second procedure for supposing the cause of an event from the contents output to a log, collecting detailed log information to prove the supposition, and determining the cause of the event.

For example, in a system where the manager computer 104 supposes the cause of an error based on the information contained in the log and collects more detailed information to prove the supposition, the following method is possible. The method is described with reference to FIG. 7.

When stealing data, a network attacker sometimes steals not only necessary data but all data that the attacker can read and transfers it to his or her own computer for later analysis. In such a case, the amount of file data transferred over the network is much larger than it usually is. Therefore, the manager computer 104 monitors the amount of file data transfer and, when it finds an amount of data transfer much larger than the normal transfer amount (step 702), it supposes that the data base is being backed up automatically (step 703).

To prove that the supposition is true, the manager computer 104 investigates the automatic backup schedule and the execution status (step 704). When the manager computer 104 finds that the computer transferring the files is not to be backed up or there is no file backup schedule, the supposition "automatic backup operation" is rejected (step 705).

Next, the manager computer 104 references the analysis rule case data base 201 and supposes that the administrator is backing up the files manually (step 706). To prove that the supposition is true, the manager computer 104 checks that the person backing up the files has a file backup authority and whether a backup instruction was issued (step 707).

If the manager computer 104 finds, as a result of the check, that the person backing up the files has no backup authority, the supposition "manual backup operation" is rejected (step 708).

The manager computer 104 further searches the data base to create a supposition that "an attacker is stealing data" (step 709). The manager computer 104 then checks the computer being used by the person transferring the files and the destination to which the files are sent (step 710). As a result, the manager computer 104 finds that the attacker is stealing data (step 712) and proves that the supposition is true (step 712).

Figure 10:
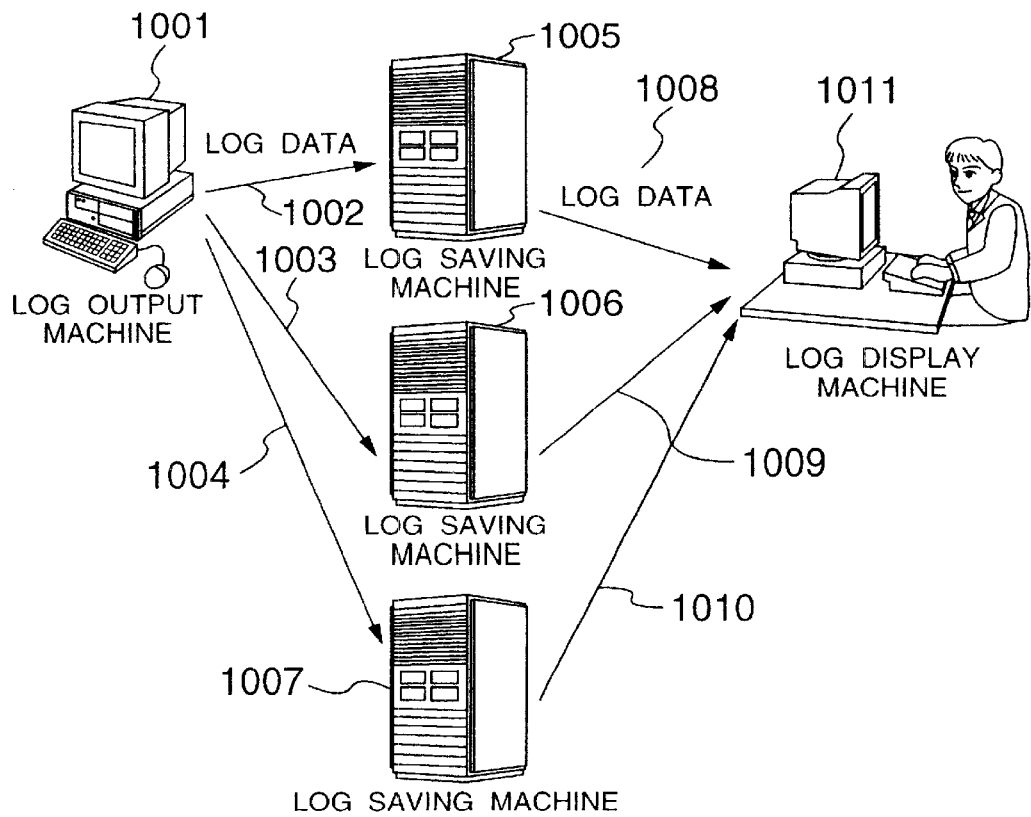
FIG. 10 is a diagram showing the configuration of a system for preventing log alterations and for restoring altered logs.

The prevention of log alteration is further described below with reference to FIG. 10.

A computer 1001 outputs the execution result of a program as a log. Then, it divides the log into multiple portions with appendage information added, adds a digital signature to the log, and then encrypts the log. The appendage information refers to information which, when the log is divided into n, allows the user to get the original contents of the log simply by using less than n portions of the log. For example, when a log to which appendage information has been added is divided into three (a, b, and c), the appendage information allows the user to get the original contents of the log by reading any two or the three portions of the log.

The following gives a more specific example. When a one-line log, composed of 1024 characters, is stored on three computers, the log is divided into two parts: the first 512 characters and the last 512 characters. And, in addition, the exclusive-OR (XOR) of the first half and the last half is used as appendage information. In this case, the XOR of the first half and the last half refers to a character string generated by exclusively-ORing the first character of the first half and that of the second half, the second character of the first half and that of the second half, and so on. This is repeated until the 512th character is processed.

The log is sent to computers 1005, 1006, and 1007 via communication lines 1002, 1003, and 1004, respectively. The computers 1005, 1006, and 1007 decrypt the received log information and save it in storage.

In most cases, a computer 1011 accesses the computers 1005, 1006, and 1007 to read the log which was output by the computer 1001. Even when the log in the storage of one of three computers 1005, 1006, and 1007 has been changed or altered, the computer 1011 can restore the log, output by the computer 1001, from the other two computers.

In the example of XOR described above, even if either the first 512-character data or the last 512-character data is lost, the lost data can be restored by XORing the lost data and the XORed data.

In this example, the computer 1001 adds appendage information to the log and divides it, adds certification information to it, and then encrypts it. Addition of certification information, addition of appendage information, and/or encryption may be omitted. In that case, the computer 1011 omits the corresponding processing.

In the above example, although the log is output, stored, and read by three computers, all of these may be done in one computer.

What is claimed is:

1. A method for monitoring a computer system in which a manager computer and a plurality of agent computers are connected over a network, comprising the steps of:

sending information on types of log to be collected from said manager computer to said plurality of agent computers;

collecting said types of log on said plurality of agent computers; and sending said collected log from said plurality of agent computers to said manager computer.

2. The method for monitoring as claimed in claim 1, wherein when a load on said network is high, sending an instruction from said manager computer to said plurality of agent computers, said instruction requesting to send information on fewer types of log.

3. The method for monitoring as claimed in claim 1, wherein when a load on said manager computer is high, sending an instruction from said manager computer to said plurality of agent computers, said instruction requesting to send log information on fewer types of log.

4. The method for monitoring as claimed in claim 1, whenin when said manager computer requires more careful monitoring, sending an instruction from said manager computer to said plurality of agent computers, said instruction requesting to send information on more types of log.

* * * * *